(12) United States Patent (10) Patent No.: US 9,213,114 B2
Bacanek et al. (45) Date of Patent: Dec. 15, 2015

(54) MULTI-PAIR POWER DISTRIBUTION

(71) Applicant: INOVA, LTD., Grand Cayman (KY)

(72) Inventors: Zeljko Bacanek, Calgary (CA); Timothy D. Hladik, Calgary (CA)

(73) Assignee: INOVA LTD., George Town, Grand Cayman (KY)

( * ) Notice: Subject to any disclaimer, the term of this patent is extended or adjusted under 35 U.S.C. 154(b) by 370 days.

(21) Appl. No.: 13/750,172

(22) Filed: Jan. 25, 2013

(65) Prior Publication Data

US 2013/0188454 A1   Jul. 25, 2013

Related U.S. Application Data

(60) Provisional application No. 61/590,670, filed on Jan. 25, 2012.

(51) Int. Cl.
*G01V 1/06* (2006.01)
*G01V 1/22* (2006.01)

(52) U.S. Cl.
CPC .......................................... *G01V 1/22* (2013.01)

(58) Field of Classification Search
USPC .......................................................... 367/76
See application file for complete search history.

(56) References Cited

U.S. PATENT DOCUMENTS

| | | | |
|---|---|---|---|
| 4,960,183 A * | 10/1990 | Young, II | 181/107 |
| 5,515,038 A | 5/1996 | Smith | |
| 5,627,798 A * | 5/1997 | Siems et al. | 367/76 |
| 5,747,750 A * | 5/1998 | Bailey et al. | 181/112 |
| 6,816,082 B1 | 11/2004 | Laborde | |
| 7,259,689 B2 * | 8/2007 | Hernandez-Marti et al. | 340/855.1 |
| 7,535,795 B2 * | 5/2009 | Varsamis et al. | 367/76 |
| 2006/0013065 A1 * | 1/2006 | Varsamis et al. | 367/76 |
| 2006/0187084 A1 * | 8/2006 | Hernandez-Marti et al. | 340/854.9 |
| 2008/0224887 A1 * | 9/2008 | Varsamis et al. | 340/853.9 |
| 2009/0147619 A1 * | 6/2009 | Welker | 367/15 |
| 2013/0188447 A1 * | 7/2013 | Bacanek et al. | 367/14 |

OTHER PUBLICATIONS

Written Opinion of the ISA for PCT/US2013/023128. Apr. 9, 2013 (4 pages).*
International Search Report for PCT/US2013/023128. Apr. 9, 2013 (2 pages).*

* cited by examiner

*Primary Examiner* — James Hulka
(74) *Attorney, Agent, or Firm* — Mossman, Kumar & Tyler PC

(57) ABSTRACT

The present disclosure relates methods and apparatus conducting a seismic survey while supplying power and data over multiple conductor pairs. In aspects, the disclosure also relates to maintaining power distribution during a failure of at least one conductor pair. The method includes superimposing data and power on each of a plurality of conductor pairs. The apparatus may include a power supply with power supplied by the plurality of conductor pairs carrying power and data.

11 Claims, 3 Drawing Sheets

MULTI-PAIR POWER DISTRIBUTION

CROSS-REFERENCE TO RELATED APPLICATIONS

This application claims priority from U.S. Provisional Application Ser. No. 61/590,670, filed Jan. 25, 2012, the disclosure of which is fully incorporated herein by reference in its entirety.

FIELD OF THE DISCLOSURE

This disclosure generally relates to conducting a seismic survey using a network configured to supply power and data.

BACKGROUND OF THE DISCLOSURE

Seismic surveys are conducted to map subsurface structures to identify and develop oil and gas reservoirs. Seismic surveys are typically performed to estimate the location and quantities of oil and gas fields prior to developing the fields (drilling wells) and also to determine the changes in the reservoir over time subsequent to the drilling of wells. On land, seismic surveys are conducted by deploying an array of seismic sensors (also referred to as seismic receivers) over selected geographical regions. These arrays typically cover 75-125 square kilometers or more of a geographic area and include 2000 to 5000 seismic sensors. The seismic sensors (such as, geophones or accelerometers) are coupled to the ground in the form of a grid. An energy source, such as an explosive charge (buried dynamite for example) or a mobile vibratory source, is used at selected spaced apart locations in the geographical area to generate or induce acoustic waves or signals (also referred to as acoustic energy) into the subsurface. The acoustic waves generated into the subsurface reflect back to the surface from subsurface formation discontinuities, such as those formed by oil and gas reservoirs. Similarly, seismic surveys may be conducted at sea using seismic arrays modified for such use. The reflections are sensed or detected at the surface by the seismic sensors (hydrophones, geophones, etc.). Data acquisition units deployed in the field proximate the seismic sensors may be configured to receive signals from their associated seismic sensors, at least partially process the received signals, and transmit the processed signals to a remote unit (typically a central control or computer unit placed on a mobile unit). The central unit typically controls at least some of the operations of the data acquisition units and may process the seismic data received from all of the data acquisition units and/or record the processed data on data storage devices for further processing. The sensing, processing and recording of the seismic waves is referred to as seismic data acquisition.

The traditional sensor used for acquiring seismic data is a geophone. Multi-component (three-axis) accelerometers, however, are more commonly used for obtaining three-dimensional seismic maps. Compared to seismic surveying layouts using the single component sensors, layouts using multi-component sensors require use of more complex data acquisition and recording equipment in the field and a substantially greater bandwidth for the transmission of data to a central location.

A common architecture of seismic data acquisition systems is a point-to-point cable connection of all of the seismic sensors. Typically, output signals from the sensors in the array are collected by data acquisition units attached to one or more sensors, digitized and relayed down the cable lines to a high-speed backbone field processing device or field box. The high-speed backbone is typically connected via a point-to-point relay with other field boxes to a central recording system, where all of the data are recorded onto a storage medium, such as a magnetic tape.

Seismic data may be recorded at the field boxes for later retrieval, and in some cases a leading field box is used to communicate command and control information with the central recording system over a radio link (radio frequency link or an "RF" link). Even with the use of such an RF link, kilometers of cabling among the sensors and the various field boxes may be required. Such a cable-system architecture can result in more than 150 kilometers of cable deployed over the survey area. The deployment of several kilometers of cable over varying terrain requires significant equipment and labor, often in environmentally sensitive areas.

Traditionally, seismic devices receive power over a power line from a power source, however, damage to the power line may result in the loss of power to seismic devices and loss of data. An additional power communication path would add power redundancy and reduce the potential for data loss. This disclosure addresses the need for power redundancy.

SUMMARY OF THE DISCLOSURE

In aspects, the present disclosure is related to methods and apparatuses for conducting a seismic survey using power transmitted over a telemetry system.

One embodiment according to the present disclosure includes a method for conducting a seismic survey, comprising: supplying power to each of a plurality of devices over a plurality of conductor pairs, the conductor pairs being configured to supply power and telemetry signals.

In some embodiments, the plurality of devices are seismic devices, and maintaining power distribution comprises supplying DC power signals over the at least one of the plurality of conductor pairs from a power supply. The method may also include connecting the plurality of conductor pairs to form at least one of a point-to-point network and a daisy chain network between the power supply and the plurality of devices; providing seismic signals to one or more of the plurality of seismic devices in response to detected reflections from acoustic energy waves directed into the earth surface; acquiring telemetry data from the seismic signals; transmitting telemetry data as telemetry signals superimposed on the power signals over the at least one of the plurality of conductor pairs by utilizing one or more center tapped transformers; and receiving the transmitted telemetry data at a central recording system.

Another embodiment according to the present disclosure includes a method for conducting a seismic survey, comprising: maintaining power distribution to each of a plurality of devices using at least one of a plurality of conductor pairs during a failure of at least one other of the plurality of conductor pairs connected to at least one of the plurality of devices, the conductor pairs being configured to supply power and telemetry signals.

Another embodiment according to the present disclosure includes a system for conducting a seismic survey, comprising: a plurality of devices; a plurality of conductor pairs in electrical communication with the plurality of devices, each of the conductor pairs being configured to convey power and telemetry signals; a power supply configured to supply the power signals to each of the plurality of devices over at least two of the plurality of conductor pairs; and a data communication device configured to communicate with each of the plurality of devices over the at least two of the plurality of conductor pairs.

In some embodiments, the plurality of conductor pairs is configured to form at least one of a point-to-point network and a daisy chain network between the power supply and each of the plurality of devices, and the plurality of devices includes a plurality of seismic devices distributed across an earth surface at intervals. The system may also include a seismic source providing acoustic energy waves into the earth surface; a plurality of seismic sensor units coupled to at least one seismic device through cabling, the seismic sensor units providing seismic signals to the at least one seismic device in response to detected reflections from the acoustic energy waves directed into the earth surface; a central recording system receiving telemetry data from one or more of the plurality of seismic devices through the data communication device; and one or more center tapped transformers configured to superimpose telemetry signals on to the power signals. The power supply may be configured to supply direct current voltage, and one or more seismic devices may be configured to transmit telemetry data as telemetry signals superimposed on the power signals over one or more of the plurality of conductor pairs, the telemetry signals superimposed on the power signals through the one or more center tapped transformers.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

The present disclosure relates to devices and methods for conducting seismic survey activities relating to seismic data acquisition. The present disclosure may be implemented in embodiments of different forms. The drawings shown and the descriptions provided herein correspond to certain specific embodiments of the present disclosure for the purposes of explanation of the concepts contained in the disclosure with the understanding that the present disclosure is to be considered an exemplification of the principles of the disclosure, and is not intended to limit the scope of the disclosure to the illustrated drawings and the description herein. A description for some embodiments for conducting a seismic survey follows below.

Figure 1:
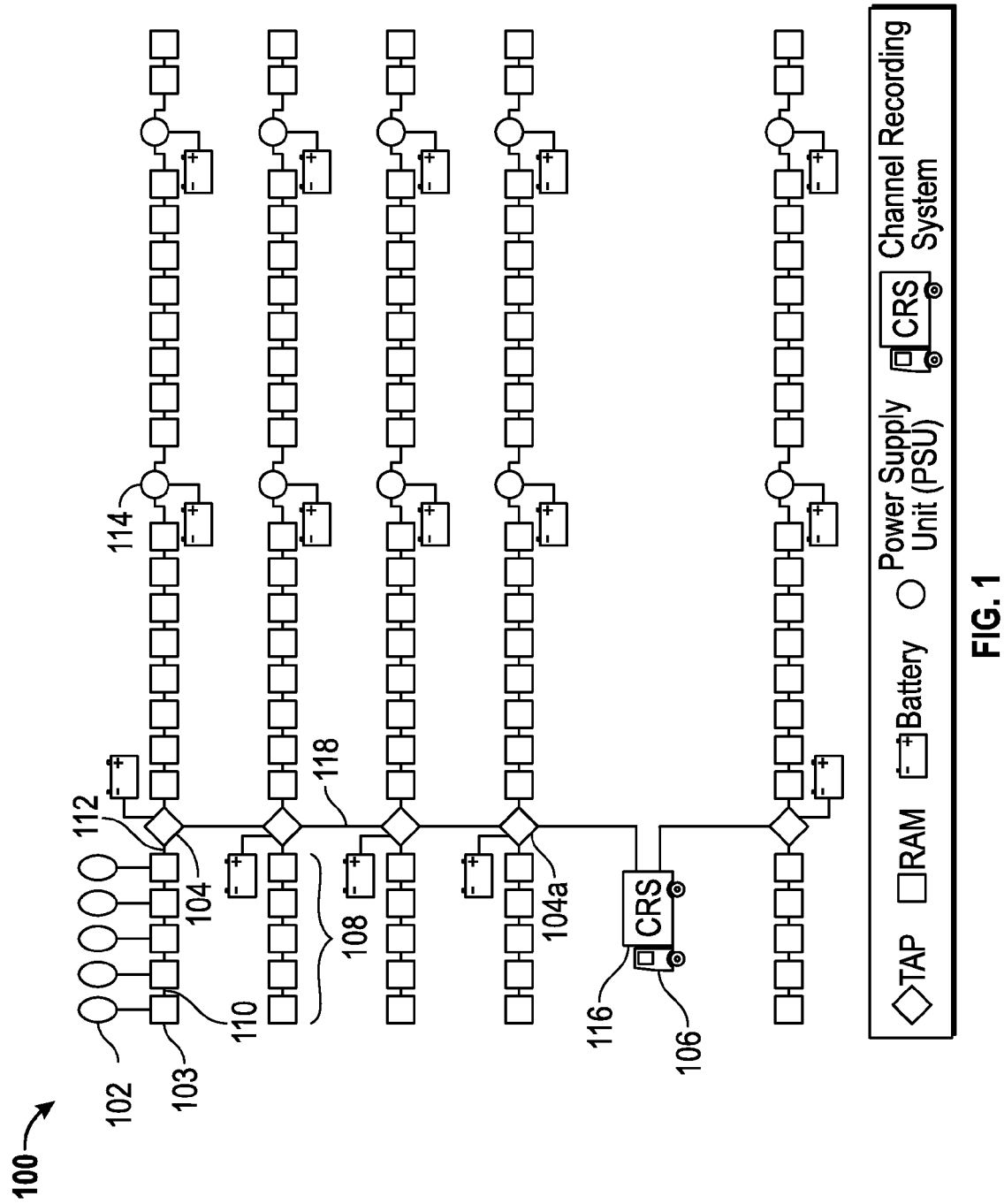
FIG. 1 shows a schematic of a seismic survey system according to one embodiment of the present disclosure.

FIG. 1 depicts an embodiment of a cable seismic data acquisition system 100. The cable seismic data acquisition system 100 includes a seismic source (not shown) providing acoustic energy waves into the earth surface and a plurality of interconnected seismic devices distributed across an earth surface at intervals. The system includes an array (string) of spaced-apart seismic sensor units 102. The seismic sensor units are coupled to at least one seismic device through cabling. The seismic sensor units provide seismic signals to the plurality of seismic devices in response to detected reflections from the acoustic energy waves. The system also includes a central recording system receiving telemetry data from one or more of the plurality of seismic devices through the data communication device.

Seismic sensor units 102 may include, but are not limited to, one more of: geophones and hydrophones. Each sensor 102 is typically coupled via cabling to a seismic data acquisition device (such as remote acquisition module (RAM) 103), and several of the data acquisition devices and associated sensors are coupled via cabling 110 to form a line or group 108. The group 108 is then coupled via cabling 112 to a line tap (such as fiber TAP unit (FTU) 104). Cable 112 may include, but is not limited to, one or more of: (i) copper conductors and (ii) fiber optic cable. Several FTUs 104 and associated lines 112 are usually coupled together by cabling, such as shown by the baseline cable 118. Baseline cable 118 includes fiber optic cable.

A RAM 103 may be configured to record analog seismic signals that are generated by seismic sensors 102, including, but not limited to, geophones and hydrophones. The RAM 103 may be configured to convert analog signals from the seismic sensors 102 into digital signals. The digitized information may then be transmitted to an FTU 104. Some RAMs 103 are configured to relay signals from other RAMs 103 in group 108, in addition to receiving signal from one or more seismic sensors 102. The digitized information transmitted by the RAM 103 may be augmented with status information. The FTU 104 may be configured to transmit the digitized information to a central recording system (CRS) 106. In some embodiments, the RAM 103 may be configured to receive programming and/or parameter information downloads from the CRS 106. RAMs 103 generally receive power from another device, such as a power supply unit (PSU) 114 or FTU 104, however, RAMs 103 may be configured to include a battery.

The FTU 104 may be configured to receive digital information from one or more RAMs 103 and retransmit that information to the CRS 106. In some embodiments, retransmitted digital information may be augmented with status information for the FTU 104. The FTU 104 may also be configured to supply power to one or more RAMs 103. FTU 104 may itself receive power from a battery 126 or PSU 114. The FTU 104 may include multiple battery ports so that power may remain uninterrupted to the FTU 104 and any connected RAMs 103 when battery 126 is undergoing replacement.

The PSU 114 includes a power supply and may be configured to transmit power to the RAMs 103. In some configurations, the power from the PSU 114 may be transmitted to the RAMs 103 through the FTU 104. PSU 114 may receive power from a battery 130. The devices involved in seismic data acquisition may be collectively referred to as "seismic devices," which may include, but is not limited to: seismic sensors 102, RAMs 103, and FTUs 104, CRS 106, and auxiliary device 116.

In some embodiments, the RAM 103 and/or the FTU 104 may be used as an auxiliary device 116. An auxiliary device 116 may be configured to operate as a timing device. The auxiliary device 116 may be positioned in a recording truck or other comparable location. In some embodiments, the auxiliary device 116 may be dedicated as a timing device. The auxiliary device 116 may be in communication with baseline cables 118 and configured to the exact timing of the seismic shooting system to ensure that the T-zero is consistent. In some embodiments, the CRS 106 may provide the timing signal. The CRS 106 may be positioned in a recording truck or other comparable location.

In the field, the sensors 102 are usually spaced between 10-50 meters. Each of the FTUs 104 typically performs some signal processing and then stores the processed signals as seismic information. The FTUs 104 may be coupled, either in parallel or in series, with one of the units 104*a* serving as an interface between the CRS 106 and one or more FTUs 104. In the cable system of FIG. 1, data are usually relayed from RAM 103 to the next RAM 103 and through several FTUs 104 before such data reaches the CRS 106.

In a typical configuration, a plurality of RAMs 103 may be laid out in intervals (such as 12@55 meters) and connected to receiver cable lines. The receiver cable lines may also be connected to FTUs 104 and PSUs 114. The PSUs 114 may be laid out in intervals as well. The PSUs 114 may be connected to RAMs 103 in a one-to-one or a one-to-many relationship. The FTUs 104 may be laid out at intersecting points of the receiver line cables 112 and baseline fiber optic cables 118. The FTUs 104 may be connected to other FTUs 104 and/or the CRS 106 via fiber baseline cables 118.

In wireless embodiments, the FTUs 104 may communicate with the CRS 106 using radio frequency transmissions and are typically bandwidth limited. In traditional wireless seismic data acquisition systems, an attribute (physical or seismic) degradation affecting the data quality is typically detected by monitoring (printing and viewing) shot (source activation) records immediately after recording.

Figure 2:
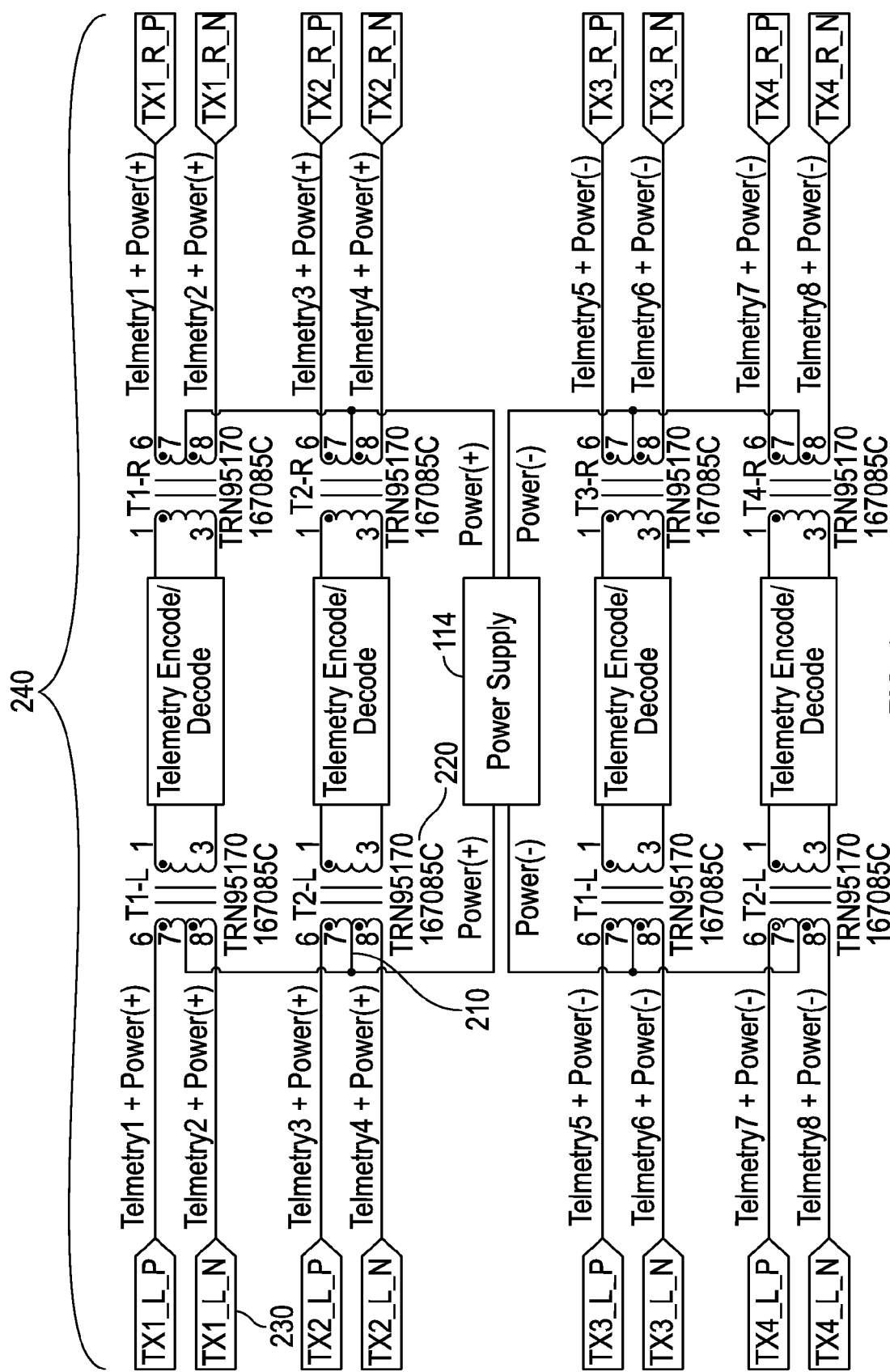
FIG. 2 shows a schematic of a multi-pair power distribution circuit according to one embodiment of the present disclosure.

FIG. 2 shows a schematic diagram for power supplied to a PSU 114 from center taps 210 on transformers 220 connected to telemetry lines 230. Through the use of the center taps 210, power and telemetry data may be communicated on the conductors 230 without substantially interfering with one another. The power conveyed over the conductor pairs 240 may be direct current. Since the power may be conveyed over conductors 230, grouped into conductor pairs 240, the devices receiving power from PSU 114 (such as RAMs 103 and FTUs 104 in FIG. 1) may have power redundancy. In the event of a failure of one of the conductor pairs 240, the power may be maintained to the PSU 114 and its downstream devices by using at least one of the operating conductor pairs 240 to supply power while communicating data. In some embodiments, the plurality of conductor pairs may be arranged to form a point-to-point network over which each of the plurality of devices is connected to at least one PSU 114. In other embodiments, the plurality of conductor pairs may be arranged to form a daisy chain over which each of the plurality of devices is connected to at least one PSU 114.

In some embodiments, every telemetry pair 240 may convey power and data. In some embodiments, a power may be supplies to PSU 114 through a dedicated power line (not shown) in addition to the power supplied over telemetry lines 230. The discussions of this multi-pair power distribution in the context of a seismic data acquisition system is exemplary and illustrative only, as the power over multiple telemetry pairs may be implemented in other areas using telemetry systems as understood by those of skill in the art.

Figure 3A:
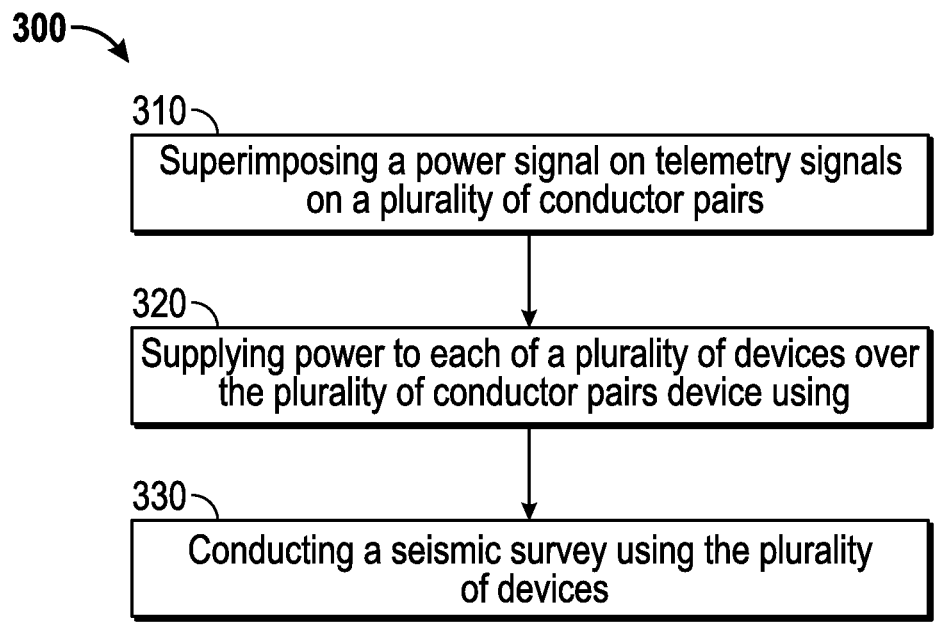
FIG. 3a shows a flow chart for a method for one embodiment according to the present disclosure.
Figure 3B:
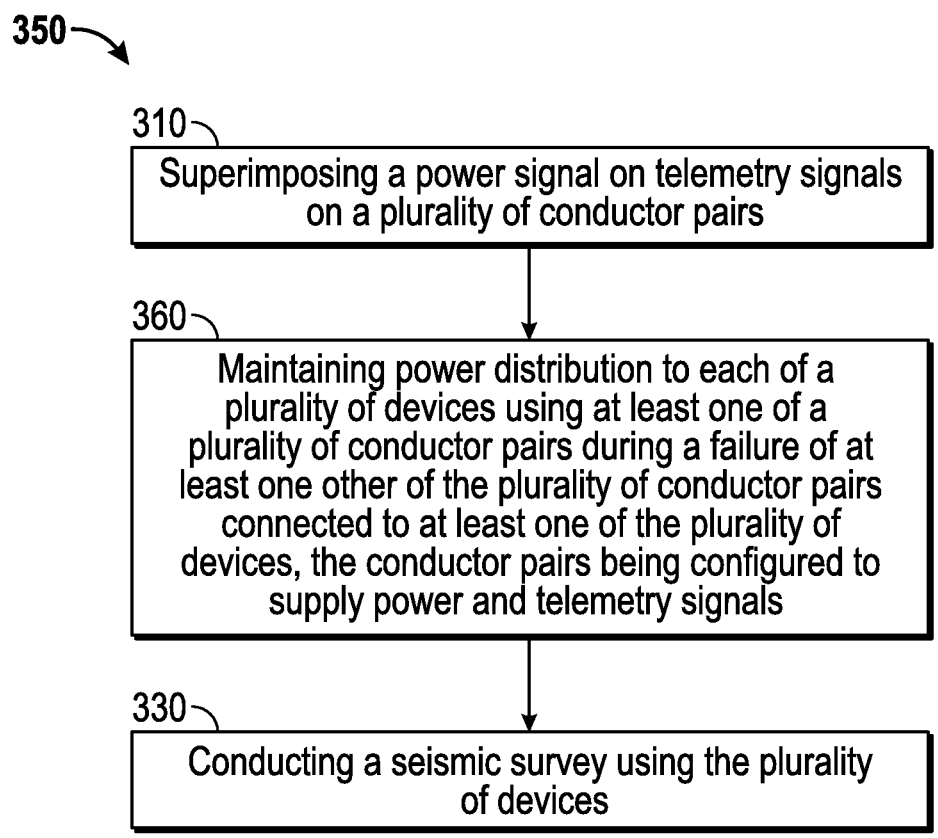
FIG. 3b shows a flow chart for a method for another embodiment according to the present disclosure.

FIG. 3(*a*) shows a flow chart 300 for conducting a seismic survey according to one embodiment of the present disclosure. In step 310, a power signal may be superimposed on telemetry signals on a plurality of conductor pairs 240. In step 320, power may be supplied to each of plurality of devices over the plurality of conductor pairs 240. In step 330, a seismic survey may be conducted using the plurality of devices.

FIG. 3(*b*) a flow chart 350 for conducting a seismic survey according to one embodiment of the present disclosure. In step 310, a power signal may be superimposed on telemetry signals on a plurality of conductor pairs 240. In step 360, power may be maintained to each of a plurality of devices 114 (and downstream devices) using at least one of a plurality of conductor pairs 240 during a failure of at least one other of the plurality of conductor pairs 240, where the plurality of conductor pairs are connected to at least one of the plurality of devices 114 and configured to convey power and telemetry signals. In step 330, a seismic survey may be conducted using the plurality of devices.

While the foregoing disclosure is directed to the one mode embodiments of the disclosure, various modifications will be apparent to those skilled in the art. It is intended that all variations be embraced by the foregoing disclosure.

What is claimed is:

1. A system for conducting a seismic survey, comprising:
a plurality of seismic devices distributed across an earth surface at intervals;
a plurality of conductor pairs in electrical communication with the plurality of seismic devices, each of the conductor pairs being configured to convey power and telemetry signals;
a power supply configured to supply the power signals to each of the plurality of seismic devices over at least two of the plurality of conductor pairs;
one or more center tapped transformers configured to superimpose the telemetry signal on to the power signal, wherein the power supply is in electrical communication with at least one center tap of the center tapped transformers; and
a data communication device configured to communicate with each of the plurality of devices over the at least two of the plurality of conductor pairs, wherein each conductor pair is in electrical communication with at least one of the center tapped transformers.

2. The system of claim 1, wherein the plurality of conductor pairs is configured to form at least one of a point-to-point network and a daisy chain network between the power supply and each of the plurality of devices, the system further comprising:
a plurality of seismic sensor units coupled to at least one seismic device through cabling, the seismic sensor units providing seismic signals to the at least one seismic device in response to detected reflections from acoustic energy waves directed into the earth surface; and
a central recording system receiving telemetry data from one or more of the plurality of seismic devices through the data communication device;
wherein the power supply is configured to supply direct current voltage, and one or more seismic devices are configured to transmit telemetry data as telemetry signals superimposed on the power signals over one or more of the plurality of conductor pairs, the telemetry signals superimposed on the power signals through the one or more center tapped transformers.

3. The system of claim 1, wherein the plurality of devices includes at least one seismic device.

4. The system of claim 1, wherein the plurality of conductor pairs are configured to supply power and data communication redundancy to the plurality of devices.

5. The system of claim 1, wherein the power supply is configured to supply direct current voltage.

6. The system of claim 1, wherein the plurality of conductor pairs is configured to form a point-to-point network between the power supply and each of the plurality of devices.

7. A method of conducting a seismic survey, comprising:
maintaining power distribution to each of a plurality of seismic devices using at least one of a plurality of conductor pairs during a failure of at least one other of the plurality of conductor pairs connected to at least one of the plurality of seismic devices, the conductor pairs being configured to supply power and telemetry signals, wherein the plurality of seismic are distributed across an earth surface at intervals;
using at least one power supply to provide the power over the plurality of conductor pairs; and
superimposing the telemetry signals on the power signals using a center tapped transformer, wherein the at least one power supply is in electrical communication with the center tap of the center tapped transformer.

8. The method of claim 7, wherein maintaining power distribution comprises supplying DC power signals over the at least one of the plurality of conductor pairs from a power supply, the method further comprising:
connecting the plurality of conductor pairs to form at least one of a point-to-point network and a daisy chain network between the power supply and the plurality of devices;
providing seismic signals to one or more of the plurality of seismic devices in response to detected reflections from acoustic energy waves directed into the earth surface;
acquiring telemetry data from the seismic signals;
transmitting telemetry data as telemetry signals superimposed on the power signals over the at least one of the plurality of conductor pairs by utilizing one or more center tapped transformers;
receiving the transmitted telemetry data at a central recording system.

9. The method of claim 7, wherein the at least one power supply comprises a DC power supply.

10. The method of claim 7, wherein each of the plurality of devices is connected to the at least one power supply using the plurality of conductor pairs to form one of: (i) a point-to-point network and (ii) a daisy chain.

11. A method of conducting a seismic survey, comprising:
supplying power to each of a plurality of seismic devices over a plurality of conductor pairs, the conductor pairs being configured to supply power and telemetry signals, wherein the plurality of seismic are distributed across an earth surface at intervals;
using at least one power supply to provide the power over the plurality of conductor pairs; and
superimposing the telemetry signals on the power signals using a center tapped transformer, wherein the at least one power supply is in electrical communication with the center tap of the center tapped transformer.

* * * * *